Patented Jan. 12, 1932                                                1,840,710

UNITED STATES PATENT OFFICE

JOSEPH F. GODDARD, OF LONDON, ENGLAND, ASSIGNOR, BY MESNE ASSIGNMENTS, TO SUPER CEMENT COMPANY, OF DETROIT, MICHIGAN, A CORPORATION OF MICHIGAN

PROCESS FOR THE PRODUCTION OF HIGH EARLY STRENGTH HYDRAULIC CEMENT

No Drawing.         Application filed August 31, 1929.   Serial No. 389,864.

My invention relates to a new and useful improvement in a process for the production of high early strength hydraulic cement and has for its object the provision of a process whereby high early strength as distinguished from high ultimate strength may be obtained in a hydraulic cement.

It is another object of the invention to provide a process whereby a hydraulic cement may be produced which will possess the property of being water proofed and at the same time being possessed of a high early strength.

Other objects will appear hereinafter.

It is recognized that the use of a tanno-catalyzed Portland cement for the purposes of producing concrete or mortar of impermeability and high ultimate strength has already been developed. The present invention however differs from the known processes in that it has been discovered that by making certain radical changes in the amount of tannin employed and by restricting the moisture content and grinding the product to a degree of fineness, a cement is produced which has the distinctive property of imparting to concrete and mortars a very high degree of strength at early periods in addition to the characteristics of impermeability and high ultimate strength developed by the use of tanno-catalyzed cement which is now known. With ordinary tanno-catalyzed cement, the cement produced under the process for adding the tannin requires a longer period to develop strength than does ordinary Portland cement. The cement produced under the present process is a tanno-catalyzed cement and is characterized by the rapidity with which it develops strength.

The invention is carried out as follows: A suitable tannin is selected and for the purposes of this disclosure alcohol extracted gallo-tannic acid of U. S. P. quality is preferred. A suitable diffusing medium such as plaster of Paris or calcined gypsum is used. The tannin and diffusing medium are intimately mixed together in suitable proportions and where alcohol extracted gallo-tannic acid of U. S. P. quality and plaster of Paris are used they are used in proportions of one part by weight of tannin to seven parts by weight of the diffusing medium. Sufficient water is then added to the mixture of tannin and diffusing medium to produce a paste and the same is allowed to set or dry. The dried mixture may then be crushed to a convenient size or finely ground and added to a Portland cement clinker, either before the latter is ground or during the grinding process and in suitable proportions determined by trial with the particular clinker employed. It has been found that a mixture of combined tannin and diffusing medium in dried form to the cement clinker may be made in the proportions of two pounds of the tannin mixture to 1000 pounds of clinker.

Concurrently with the addition of the dry mixture of tannin and diffusing medium to the clinker, or at any other appropriate stage of the grinding process, there shall be added such proportion of gypsum or other retarding agent as will satisfactorily regulate the setting time of the finished cement. This practice of adding a retarding agent to the cement during the grinding process in order to regulate the setting time is so well known and universally practiced that it requires no elaboration beyond the statement that under normal conditions the dried mixture of tannin and diffusing medium may be considered to have a retarding or regulating effect approximately equal to an equivalent quantity of gypsum.

It is desirable in the practice of the invention that the moisture content of the materials shall be such that the ignition loss of the finished product shall not exceed a value of 0.6%. The moisture content is restricted in any suitable manner either by maintaining the clinker in the moisture free condition in which it leaves the kiln or subjecting the clinker to a proper drying process should the same become moisture laden after it has left the kiln. It is also desirable in the practice of the invention that the finished product shall be ground to such fineness that at least 95% will pass through a standard sieve having 200 meshes per inch.

It is believed that the high early strength characteristic of cement produced according to this invention is attained through the effect of the tannin as a stimulant to the hydration of the di-calcium silicate contained in the cement clinker and that this stimulating effect can only be attained through a selection of appropriate materials and combining as herein described.

What I claim is:

1. The method in the manufacture of hydraulic cement or preparing a cement clinker, adding thereto a suitable retarder and a quantity of tannin and grinding the whole to a fineness sufficient to permit for passage of at least ninety-five per cent through a two-hundred mesh seive.

2. The process in the manufacture of tanno-catalyzed hydraulic cement consisting in restricting the moisture content of and grinding the product to a fineness that will enable the passage of at least ninety-five per cent thereof through a two-hundred mesh sieve.

3. The process, in the manufacture of hydraulic cement, consisting of preparing a cement clinker, grinding the same in a condition free from moisture, adding thereto, prior to the finishing of the grinding process, a retarding agent and a quantity of tannin mixed with a suitable diffusing medium, and subsequently grinding the mass to such a degree of fineness as to permit the passage of at least ninety-five percent thereof through a two-hundred mesh sieve.

4. The process, in the manufacture of hydraulic cement, consisting of preparing a cement clinker, adding thereto a gypsum retarder and a quantity of tannin mixed with a suitable diffusing medium, and grinding the mass in a condition free from moisture to such a degree of fineness as will permit the passage of at least ninety-five percent thereof through a two-hundred mesh sieve.

5. In combination, a cement clinker ground in a condition free from moisture, a retarding agent, and a quantity of tannin, all ground to a sufficient degree of fineness as to permit the passage of at least ninety-five percent thereof through a two-hundred mesh sieve.

6. In combination, a hydraulic cement, consisting of cement clinker ground in a condition free from moisture, a quantity of retarding agent, a quantity of tannin, and a suitable diffusing medium, all ground to a sufficient degree of fineness as to permit the passage of at least ninety-five percent thereof through a two-hundred mesh sieve.

7. A hydraulic cement, consisting of cement clinker, a retarding agent, and tannin, intimately mixed together and ground to a sufficient degree of fineness as to permit the passage of at least ninety-five percent thereof through a two-hundred mesh sieve.

8. A hydraulic cement, consisting of cement clinker, gypsum, tannin, and a diffusing medium, intimately mixed and ground to a sufficient degree of fineness as to permit the passage of at least ninety-five percent thereof through a two-hundred mesh sieve.

In testimony whereof I have signed the foregoing specification.

JOSEPH F. GODDARD.